United States Patent
Uenishi et al.

(10) Patent No.: US 6,380,345 B1
(45) Date of Patent: Apr. 30, 2002

(54) PROCESS FOR PRODUCING POLYCARBONATES

(75) Inventors: Kazuhiro Uenishi, Ehime; Masasi Simonaru, Yamaguchi; Toru Sawaki, Yamaguchi; Katsushi Sasaki, Yamaguchi, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/478,540

(22) Filed: Jan. 6, 2000

(30) Foreign Application Priority Data

Jan. 6, 1999 (JP) .......................................... 11-001217

(51) Int. Cl.$^7$ ............................................ C08G 64/00
(52) U.S. Cl. ...................................................... 528/200
(58) Field of Search .......................................... 528/200

(56) References Cited

U.S. PATENT DOCUMENTS 5,576,414 A   11/1996   Wilhelm et al. ............ 528/199

FOREIGN PATENT DOCUMENTS

| EP | 0 635 532 A | 1/1995 |
|---|---|---|
| JP | 06065367 | 3/1994 |
| JP | 06073174 | 3/1994 |
| WO | 97/38039 | 10/1997 |

Primary Examiner—Terressa M. Boykin
(74) Attorney, Agent, or Firm—Sughrue Mion, PLLC

(57) ABSTRACT

Purpose

To enable the reduction of the quantities of wastes and the performance of long term continuous operation in polycarbonate production.

Means for solution

As a method for removing the reaction byproducts in the production of a polycarbonate resin by sucking and reducing the pressure, ejectors which use the vapor of a substance comprising the condensed liquid of the reaction byproducts as the driving source are used, and the wall temperatures of piping between a polymerization reactor and the ejectors are held at a temperature equal to the boiling point of said reaction byproducts at reduced pressure or higher.

25 Claims, 1 Drawing Sheet

PROCESS FOR PRODUCING POLYCARBONATES

DETAILED DESCRIPTION OF THE INVENTION

1. Technical Field of the Invention

This invention relates to a production method of a polycarbonate resin, more particularly the production method of the polyearbonate resin enabling the reduction of a waste liquid and a long term continuous operation in an economically advantageous method by using an ejector as a method for removing reaction byproducts generated in the production of the polycarbonate resin by drawing for reducing a pressure thereof.

2. Description of the Related Arts

An aromatic polycarbonate resin is excellent in mechanical properties such as an impact resistance, etc., and also in heat resistance, transparency, etc., and widely used as a molding material.

As the production method of such aromatic polycarbonate resin, a method for directly reacting an aromatic dihydroxy compound such as bisphenol, etc., with phosgene (a boundary method), or a method for performing the transesterification reaction of the aromatic dihydroxy compound such as bisphenol with an aromatic carbonic acid diester such as diphenyl carbonate (a melting method), are known.

Among such production methods, the method for producing the polycarbonate resin by the transesterification reaction of the aromatic dihydroxy compound with the aromatic carbonic acid diester, is performed by heating the reaction mixture for elevating a reaction temperature from 150° C. which is the lowest temperature for initiating the transesterification reaction, gradually to approximately 350° C., using an organic acid salt, an inorganic acid salt, an oxide, a hydroxide, a hydride, an alcoholate or the like of a metal as a catalyst and also gradually reducing a reaction pressure from atmospheric pressure to $13.3 \times 10^{-6}$ MPa for distilling off generated reaction byproducts from the reaction mixture.

Therefore, it was necessary for a piping connecting a polymerization reactor with a vacuum pump, a vacuum trap and the vacuum pump used in the above process to provide a specific consideration for preventing clogging caused by a solidification in regard to a vapor of phenolic byproducts, decomposed materials by the reaction, and un-reacted materials and/or lowly polymerized materials accompanied therewith. Further, since the reaction byproducts contain reusable substances (effective components) such as phenolic compounds and aromatic carbonic acid diesters, it was important to recover and reuse thereof to economically produce polycarbonates by a transesterification process.

Regarding a process for collecting vapor of an aromatic monohydroxy compound as the byproduct of the transesterification reaction by a condensing apparatus, Japanese unexamined patent publication JP-6-73174A has proposed a process. However, such a process has a problem that it is hardly applicable in the case where the reaction is carried out under high vacuum like $666 \times 10^{-6}$ MPa (5 Torr) or lower. Especially, in a polymerization reactor (the latter stage polymerization reactor) for producing a polycarbonate having a viscosity average molecular weight of 10000 or more, which is operated under a reduced pressure of $666 \times 10^{-6}$ MPa or lower, reaction byproducts can not be collected in some cases in a liquid phase, thereby a trouble of clogging caused by solidification tends to occur, and a large number of efforts, for example, two condensers are placed in parallel, are necessary to perform a long term continuous operation, .

In addition, for these purposes, a process placing a scrubber between a polymerization reactor and a vacuum pump, as described in Japanese unexamined patent publication JP-6-065367, the publication WO97/38039 or the like, has been proposed; and a liquid sealing type vacuum pump is generally used as the vacuum pump.

However, in the melting method, with the view of keeping its economical advantages, it was extremely important to recover the reaction byproducts produced as byproduct and use them repeatedly by converting into the carbonic acid diester as a raw material for the polymerization.

That is, in the latter stage polymerization reactor, not only a transesterification reaction which accompanies the production of a monohydroxy compound as byproduct, but also a transesterification reaction which accompanies the production of an aromatic carbonic acid diester as byproduct occur. Since the aromatic carbonic acid diester produced as byproduct is the same compound as the aromatic carbonic acid diester which is used as the raw material of the polymerization, it becomes more advantageous to collect and recover the aromatic carbonic acid diester of the byproduct, and recycle it directly into the polymerization process from the view point of economy. However, in the process described in Japanese unexamined patent publication JP-6-065367A, which uses, for example, tetraethylene glycol as a scrubber liquid, there have been such problems in the recycling that the recovery percentages of the effective components decrease, and also a trace of third components such as tetraethylene glycol are mixed in the recovered effective components.

Under these circumstances, effective collecting processes have been investigated. The publication of WO97/38039 discloses a process using a phenol solution containing a melting point-lowering agent as a scrubber liquid in order to solve such problems, but still the influence of the melting point-lowering agent can not be avoided, and problems have remained with regard to the recovery of the effective components.

Further, in the description of the present invention, "reaction byproducts" means a mixture of a vapor of phenolic byproducts, decomposed materials by the reaction, accompanied un-reacted raw materials and/or lowly polymerized materials, which are drawn by a vacuum drawing system such as the vacuum pump from the polymerization reactor, and "condensed reaction byproducts" means that the reaction byproducts condensed in the vacuum drawing system. Problem to be solved by this invention However, in the above exchangeable type condenser used conventionally, since the reaction byproducts are removed by condensing on a heat conducting surface cooled at a melting point thereof or lower for condensing under vacuum between the polymerization reactor and the vacuum pump, a large heat conducting surface area is necessary to lead a large scale facility unavoidably. Also, there is large pressure fluctuation caused by the gradual clogging of piping passages by the solidification especially of the byproduct phenolic compound and aromatic carbonic acid diester compound among the reaction byproducts into a cotton like state on the heat conducting surface, and there is such a problem that the vacuum pump can not generate the vacuum because of the generation of the solidification, etc., at the moving parts in the vacuum pump by drawing a part of the reaction byproducts into it; and thereby a high exchanging frequency of the pump is required for preventing such a problem that the pump becomes unoperative, and the quality of the product is badly affected, and also the influence on the economy thereof can not be disregarded.

When a scrubber is used, it is installed between the polymerization reactor and the vacuum pump, and removes the reaction byproducts; however, the selection of a liquid to be used for scrubbing is difficult because it is desirably a substance having such characteristics that its vapor pressure is lower than the polymerization reaction pressure at its using temperature, it has a sufficient solubility for the drawn reaction byproducts, and also it does not react with the reaction byproducts dissolved in the scrubber liquid, and is easily separable from the monohydroxy compound and the aromatic carbonic acid diester after scrubbing. Further, since there are problems of a waste liquid treatment and the recovery of effective components which becomes complex in this process, the process is economically not feasible. Furthermore, the mingling of trace of the scrubber liquid components into the recovered monohydroxy compound and aromatic carbonic acid diester can not be avoided, and the problems affecting the quality of product can not be disregarded when the recovered components are recycled.

It is possible to use, as a scrubber liquid, the monohydroxy compound generated in the transesterification reaction, but the vapor pressure at the melting point of the substance being high, there is a limitation in the degree of vacuum to be applied. For example, in the case of the transesterification reaction of diphenyl carbonate with an aromatic dihydroxy compound, which is the most common case in the melting method, phenol is produced as a byproduct; and the vapor pressure of phenol at the melting point is about $133 \times 10^{-6}$ MPa (1 Torr), and when safety in operational is considered, it is difficult to use phenol as the scrubber liquid for collecting the reaction byproducts under vacuum in the polymerization reactor operated at $666 \times 10^{-6}$ MPa (5 Torr) or lower.

In the case of using a liquid sealing type vacuum pump, since the reaction byproducts are directly drawn into the vacuum pump, although there is an advantage of not requiring a barometric leg, the reaction byproducts mingled in the vacuum pump reduce the performance of the vacuum pump gradually to generate the pressure fluctuation, also since the temperature of the drawn reaction byproducts is high, the materials constituting the pump tend to be deteriorated, and since the carbonized materials of the reaction byproducts stick to the inside of the pump, problems in the endurance of the vacuum pump occur. Also the treatment of the waste liquid of the sealing liquid and the recovery of effective components become big problems.

The purpose of the present invention is to provide a process for producing a polycarbonate resin efficiently at a low cost by developing a vacuum system for a latter stage polymerization, capable of improving the above technological problems, enabling a long term continuous operation, having less problems in the treatment of the waste liquid, easy in the recovery of the effective components and free from the problem of impurity.

Means for solving the problems

The present invention provides a production process of a polycarbonate resin characterized in that, in a production process of polycarbonate resin having a step of performing a polycondensation reaction of an aromatic diol compound with an aromatic carbonic acid diester, the process for collecting the reaction byproducts of the polycondensation reaction for producing the polycarbonate resin by drawing and reducing the pressure is provided with an ejector which uses vapor of a substance comprising condensed reaction byproducts as a driving source, and the temperature of the wall of piping between a polymerization reactor and an ejector is kept equal to the boiling point of the reaction byproducts or higher at the reduced pressure.

Further, the vapor of the reaction byproducts drawn by the ejector is condensed to obtain a condensed liquid comprising the reaction byproducts preferably by a barometric condenser, and as the collecting apparatus, preferably plural ejectors and one or more barometric condensers are used.

Furthermore, the cooling liquid for the barometric condenser is preferably a liquid comprising the condensed reaction byproducts; and in the final stage of the ejectors is placed preferably a liquid ejector which uses a liquid comprising the condensed reaction byproducts as driving liquid.

In the present invention, the reaction byproducts are mainly an aromatic hydroxy compound and an aromatic carbonic acid diester compound, and it is preferable that the aromatic hydroxy compound is a phenolic compound and the aromatic carbonic acid diester is a diaryl carbonate compound.

Further, the present invention relates to a production process of a polycarbonate resin characterized in that, in the production of a polycarbonate resin by the polycondensation of an aromatic diol compound with an aromatic carbonic acid diester compound, the reaction byproducts produced as byproduct in the polycondensation of said polycarbonate resin are drawn and collected by using an ejector which uses the vapor of the substance comprising said condensed reaction byproducts as a diving source and a barometric condenser which uses a liquid comprising said condensed reaction byproducts as a cooling liquid, and a part of the collected reaction byproducts are fed into the manufacturing process of the polycarbonate resin after purification if necessary.

Further, in the present specification, "a phenolic compound" means a monohydroxy compound and, for example, phenol, cresol, xylenol, salicylic acid, esters of salicylic acid, etc., are cited, and among them, phenol is the most preferable. Also, the "barometric condenser" is a kind of scrubbers, which is placed directly following a vapor ejector, and directly mixes, together with driving vapor, the drawn vapor-state reaction byproducts with a solution mainly comprising a large amount of the condensed liquid of reaction byproducts to condense the reaction byproducts and the driving vapor, and discharges the mixture by utilizing the barometric leg for maintaining the vacuum by a hydraulic pressure head.

The aromatic polycarbonate resin in the present invention is an aromatic polycarbonate resin obtained by performing a melt polycondensation reaction of a mixture containing mainly an aromatic diol compound and an aromatic carbonic acid diester in the presence of a transesterification catalyst consisting of a nitrogen-containing basic compound, an alkali metal compound and/or an alkaline earth metal compound.

As such an aromatic diol compound, the compound shown by the following formula (1) is preferably used,

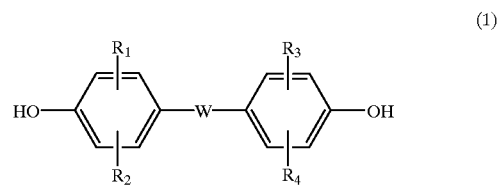

(1)

[in the formula (1), $R_1$, $R_2$, $R_3$ and $R_4$ are each independently a hydrogen atom, a halogen atom, an alkyl group having 1 to 10 carbon atoms, an aralkyl group having 7 to 20 carbon atoms or an aryl group having 6 to 20 carbon atoms; W is an alkylidene group having 2 to 10 carbon atoms, an alkylene group having 1 to 15 carbon atoms, an aryl-substituted alkylene group having 7 to 20 carbon atoms, a cycloalkylidene group having 3 to 15 carbon atoms, a cycloalkylene group having 3 to 15 carbon atoms, an oxygen atom, a sulfur atom, a sulfoxide group or a sulfone group].

As concrete examples of the aromatic diol compound, bis(4-hydroxyaryl)alkane compounds such as bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)phenylmethane, 4,4'-dihydroxyphenyl- 1,1'-m-diisopropylbenzene and 4,4'-dihydroxyphenyl-9,9-fluorene;
bis(hydroxydiaryl)cycloalkane compounds such as 1,1-bis(4-hydroxyphenyl)cyclopentane, 1,1-bis(4-hydroxyphenyl)cyclohexane, 1,1-bis(4-hydroxyphenyl)-3,3,5-trimethylcyclohexane, 1-methyl-1-(4-hydroxyphenyl)-4-(dimethyl-4-hydroxyphenyl)methylcyclohexane, 4-{1-[3-(4-hydroxyphenyl)-4-methylcyclohexyl]-1-methylethyl}phenol, 4,4'-[1-methyl-4-(1-methylethyl)-1,3-cyclohexanediyl]bisphenol, 9,9-bis(4-hydroxy-3-methylphenyl)fluorene and 2,2,2',2'-tetrahydro-3,3,3',3'-tetramethyl-1,1'-spirobis-[1H-indene]-6,6'-diol; dihydroxyaryl ethers such as bis(4-hydroxyphenyl) ether, bis(4-hydroxy-3,5-dichlorophenyl) ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide;
dihydroxydiaryl sulfones such as 4,4'-dihydroxydiphenyl sulfone and 4,4'-dihydroxy-3,3'-dimethyldiphenyl sulfone; dihydroxydiaryl isatin compounds such as 4,4'-dihydroxydiphenyl-3,3'-isatin; dihydroxydiaryl xanthene compounds such as 3,6-dihydroxy-9,9-dimethylxanthene; dihydroxybenzene compounds such as resorcin, 3-methylresorcin, 3-ethylresorcin, 3-butylresorcin, 3-t-butylresorcin, 3-phenylresorcin, 3-cumylresorcin, hydroquinone, 2-methylhydroquinone, 2-ethylhydroquinone, 2-butylhydroquinone, 2-t-butylhydroquinone, 2-phenylhydroquinone and 2-cumylhydroquinone; and dihydroxydiphenyl compounds such as 4,4'-dihydroxydiphenyl and 3,3'-dichloro-4,4'-dihydroxydiphenyl are cited.

Among them, 2,2-bis(4-hydroxyphenyl)propane is preferred from the view point of stability as a monomer, easy availability of the substance having a low content of impurities, and so forth.

As the aromatic carbonic acid diester, a diaryl carbonate, concretely, diphenyl carbonate, ditolyl carbonate, bis(chlorophenyl) carbonate, m-cresyl carbonate, dinaphthyl carbonate, bis(diphenyl) carbonate, etc., can be used. Among them, diphenyl carbonate is especially preferable.

Further, the polycarbonate resin in the present invention is allowed to contain as necessary, for example, ethylene glycol, 1, 4-butane diol, 1, 4-cyclohexane dimethanol, 1,10-decane diol, etc., as an aliphatic diol compound, also for example, succinic acid, isophthalic acid, 2,6-naphthalene dicarboxylic acid, adipic acid, cyclohexane dicarboxylic acid, terephthalic acid, etc., as a dicarboxylic acid compound, and also for example, lactic acid, p-hydroxybenzoic acid, 6-hydroxy-2-naphthoic acid, etc., as a hydroxycarboxylic acid compound.

As the alkali metal compound used as the catalyst, for example, a hydroxide, a hydrogencarbonate, a carbonate, an acetic acid salt, a nitric acid salt, a nitrous acid salt, a sulfurous acid salt, a hydrocyanic acid salt, a thiocyanic acid salt, a stearic acid salt, a boron hydride salt, a benzoic acid salt, a hydrogenphosphoric acid salt, a bisphenol and a phenolic salt, etc., of an alkali metal are cited.

As concrete examples, sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium nitrate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenyl borate, potassium phenyl borate, lithium phenyl borate, sodium benzoate, potassium benzoate, lithium benzoate, disodium hydrogen phosphate, dipotassium hydrogen phosphate, dilithium hydrogen phosphate, disodium salt, dipotassium salt and dilithium salt of bisphenol A, sodium salt, potassium salt and lithium salt of phenol, etc., are cited. Among them, disodium salt of bisphenol A and sodium salt of phenol are preferably used.

As the alkaline earth metal compound used as the catalyst, for example, a hydroxide, a hydrogencarbonate, a carbonate, an acetic acid salt, a nitric acid salt, a nitrous acid salt, a sulfurous acid salt, a cyanic acid salt, a thiocyanic acid salt, a stearic acid salt, a benzoic acid salt, a bisphenol salt, a phenolic salt, etc., of an alkaline earth metal are cited.

As concrete examples, calcium hydroxide, barium hydroxide, strontium hydroxide, calcium hydrogencarbonate, barium hydrogencarbonate, strontium hydrogencarbonate, calcium carbonate, barium carbonate, strontium carbonate, calcium acetate, barium acetate, strontium acetate, calcium nitrate, barium nitrate, strontium nitrate, calcium nitrite, barium nitrite, strontium nitrite, calcium sulfite, barium sulfite, strontium sulfite, calcium cyanate, barium cyanate, strontium cyanate, calcium thiocyanate, barium thiocyanate, strontium thiocyanate, calcium stearate, barium stearate, strontium stearate, calcium borohydride, barium borohydride, strontium borohydride, calcium benzoate, barium benzoate, strontium benzoate, calcium salt, barium salt and strontium salt of bisphenol A, calcium salt, barium salt and strontium salt of phenol, etc., are cited.

The alkali metal compound or alkaline earth metal compound as the catalyst is preferably used in such a ratio that the alkali metal element or alkaline earth metal element in the above catalyst becomes $1 \times 10^{-8}$ to $5 \times 10^{-5}$ equivalent based on 1 mol of the aromatic diol compound. More preferable ratio is that becoming $5 \times 10^{-7}$ to $1 \times 10^{-5}$ equivalent on the same base. If the ratio departs out of the above range for use, this is not preferable since there are various problems such that the various physical properties of the obtained polycarbonate are affected badly and that the transesterification reaction does not sufficiently progress and a high molecular weight polycarbonate resin can not be obtained.

Also, as the nitrogen-containing basic compound as the catalyst, for example, ammonium hydroxides having an alkyl, an aryl, and alkylaryl groups such as tetramethyl ammonium hydroxide ($Me_4NOH$), tetraethylammonium hydroxide ($Et_4NOH$), tetrabutyl ammonium hydroxide ($Bu_4NOH$), benzyltrimethyl ammonium hydroxide ($PhCH_2$ (Me)$_3$NOH), hexadecyltrimethyl ammonium hydroxide, etc., tertiary amines such as triethylamine, tributylamine, dimethylbenzylamine, hexadecyldimethylamine, etc., or basic salts such as tetramethylammonium borohydride (Me$_4$NBH$_4$), tetrabutylammonium borohydride (Bu$_4$NBH$_4$), tetramethylammonium tetraphenyl borate (Me$_4$NBPh$_4$), tetrabutylammonium phenyl borate (Bu$_4$NBPh$_4$), etc., are cited, and among them, tetramethylammonium hydroxide is preferably used.

The above nitrogen-containing basic compound is preferably used in a ratio of $1 \times 10^{-5}$ to $5 \times 10^{-3}$, more preferably $2 \times 10^{-5}$ to $5 \times 10^{-4}$, especially preferably $5 \times 10^{-5}$ to $5 \times 10^{-4}$ equivalent based on the aromatic diol compound.

In the present invention, as desired (a) an alkali metal salt of an ate complex of an element of the 14th group of the Periodic Table or (b) an alkali metal salt of an oxo acid of an element of the 14th group of the Periodic Table can be used as the alkali metal compound of the catalyst. The elements of the 14th group of the Periodic Table means silicon, germanium and tin.

By using these alkali metal compound as the catalyst for the polycondensation reaction, it has an advantage to promote the polycondensation reaction rapidly and sufficiently. And also. it is possible to suppress unfavorable reactions such as a branching reaction in the polycondensation reaction at a low level.

As the alkali metal salts of the ate complex of the element of the 14th group of the Periodic Table, they are those described in Japanese unexamined patent application Hei-7-268091, concretely a germanium (Ge) compound such as; NaGe(OMe)$_5$, NaGe(OEt)$_3$, NaGe(OPr)$_5$, NaGe(OBu)$_5$, NaGe(OPh)$_5$, LiGe(OMe)$_5$, LiGe(OBu)$_5$ and LiGe(OPh)$_5$ can be cited As the compound of tin (Sn) such as; NaSn(OMe)$_3$, NaSn(OMe)$_2$(OEt), NaSn(OPr)$_3$, NaSn(O-n-C$_6$H$_{13}$)$_3$, NaSn(OMe)$_5$, NaSn(OEt)$_5$, NaSn(OBu)$_5$, NaSn(O-n-C$_{12}$H$_{25}$)$_5$, NaSn(OEt), NaSn(OPh)$_5$, and NaSnBu$_2$(OMe)$_3$ can be cited.

Also, as the alkali metal salts of the oxo acid of the elements of the 14th group of the Periodic Table, for example, alkali metal salts of silicic acid, stannic acid, germonous (II) acid, and germanic (IV) acid are cited-as preferable.

As the alkali metal salts of silicic acid, for example, an acidic or a neutral alkali metal salt of monosilicic acid or a condensed compound thereof, for example, monosodium orthosilicate, disodium orthosilicate, trisodium orthosilicate and tetrasodium orthosilicate can be cited.

As the alkali metal salts of stannic acid, for example, an acidic or a neutral alkali metal salt of monostannic acid or a condensed compound thereof, for example, disodium monostannate (Na$_2$SnO$_3$xH$_2$O, x=0–5) and tetrasodium monostannate (Na$_4$SnO$_4$) can be cited.

As the alkali metal salts of germanous (II) acid, for example, an acidic or a neutral alkali metal salt of monogermanous acid or a condensed compound thereof, for example, monosodium germanate (NaHGeO$_2$) can be cited.

As the alkali metal salts of germanic (IV) acid, for example, an acidic or a neutral alkali metal salt of monogermanic acid or a condensed compound thereof, for example, monolithium orthogermanate, disodium orthogermanate, tetrasodium orthogermanate, disodium digermanate (Na$_2$Ge$_2$O$_5$), disodium tetragermanate (Na$_2$Ge$_5$O$_{11}$) can be cited.

The polycondensation catalysts such as above can be preferably used in a ratio of $1 \times 10^{-8}$ to $5 \times 10^{-5}$, more preferably $5 \times 10^{-7}$ to $1 \times 10^{31\ 5}$ equivalent based on 1 mol of the aromatic diol compound.

For the above polycondensation reaction at least one kind of a co-catalyst selected from a group consisting of an oxo acid or an oxide of the elements of the 14th group of the Periodic Table, can be coexisted together with the above catalyst as necessary.

By using these co-catalyst in a specific ratio, it is possible to suppress more effectively the branching reaction which tends to occur in the polycondensation reaction, the generation of the foreign material in an apparatus on molding process and other unfavorable side reactions such as a scorch without harming the rates of the terminal blocking creaction and the polycondensation reaction.

As the oxo acids of the elements of the 14th group in the Periodic Table, for example, silicic acid, stannic acid and germanic acid can be cited.

As the oxides of the elements of the 14th group in the Periodic Table, for example, silicon monoxide, silicon dioxide, stannous monoxide, stannic dioxide, germanous monoxide, germanic dioxide and their condensed compounds can be cited.

The co-catalysts are preferably made as present in a ratio of the metal element of the 14th group of the Periodic Table of 50 mol (atom) or less based on 1 mol (atom) of the alkali metal element in the polycondensation catalyst. If the co-catalyst is used in a ratio of exceeding 50 mol (atom) of the metal element, then it is not preferable since the polycondensation reaction rate becomes slow.

The co-catalysts are more preferably present in a ratio of the metal element of the 14th group of the Periodic Table of 0.1 to 30 mol (atom) based on 1 mol (atom) of the alkali metal element in the polycondensation catalyst.

These catalyst systems have an advantage of promoting the polycondensation reaction and a terminal blocking reaction rapidly and sufficiently by using in the polycondensation reaction. Also, it is possible to suppress the unfavorable side reactions such as the branching reaction generated in the polycondensation reaction system at a low level.

In the present invention, there is no particular limitation in the temperature and pressure for the transesterification of the aromatic dihydroxy compound with the carbonic acid diester, and although any condition of a temperature and a pressure at which the reaction is initiated and the monohydroxy compound generated by the reaction is rapidly removed to the outside of the system is allowed, it is general to perform the reaction by initiating the reaction at a temperature of 150° C. to 200° C. and a pressure of $40,000 \times 10^{-6}$ to $13,333 \times 10^{-6}$ MPa, then elevating the temperature in accordance with the increase of the molecular weight of the polycarbonate resin accompanying to the progress of the reaction, reducing the reaction pressure, reaching finally at a temperature of 270° C. to 350° C. and a pressure of $133 \times 10^{-6}$ MPa or lower.

Further in detail, the reaction is performed preferably at a temperature of 150–220 and a pressure of $40,000 \times 10^{-6}$ to $13,333 \times 10^{-6}$ MPa in a range of the viscosity-average molecular weight (Mv) of the polycarbonate resin of 1,000–2,000, at 200° C. −250° C. and $1,333 \times 10^{-6}$ to $13,333 \times 10^{-6}$ MPa in a range of Mv of 4,000 to 6,000, and at 250° C. to 300° C. and $133 \times 10^{-6}$ MPa or lower in a range of Mv exceeding 6,000. Further, all of the used unit of the pressure is the absolute pressure unless otherwise noted.

There is no particular limitation in the form of facilities for performing the present invention, and it can be executed in either one of a batchwise or a continuous method. In the case of conducting the production in the batchwise method, usually 2 reactors are installed in series, in which an agitation vessel installed with a rectifying column is used as the former one and an agitation vessel without having the rectifying column is used as the latter one, and the reaction is performed each under different condition. In this case it is preferable that both vessels are connected with a piping equipped with a valve, the reaction product in the former is transferred into the latter by using a facility equipped with a pump for transferring the reaction liquid as necessary without coming in contact with outside air, and the reaction is performed until obtaining a desired degree of polymerization.

In the case of performing in the continuous method, it is executed by installing usually two or more reactors in series, connecting the adjacent reactors with piping, using as necessary a facility equipped with a pump for transferring the reaction liquid, supplying the raw materials and the catalyst into the first reactor, while maintaining each of the reactors under each different condition, and taking out the polycarbonate resin having a desired degree of polymerization from the final reactor continuously.

In these facilities, the piping connecting the polymerization reactor with the vacuum pump, a capturing apparatus, and a vacuum pump play an important role for preventing the clogging caused by the reaction byproducts generated in the polymerization reactor.

To solve the problem, it is important to control the temperature of the wall surface of the vacuum piping and also to collect the reaction byproducts, heretofore various examinations for collecting them were tried, and various devices such as a surface condenser, a scrubber, a liquid sealing type vacuum pump, etc., were proposed. However, actually there still remain big problems in the treatment of the generated waste liquid, the separation and recovery of the effective components, the qualities of the recovered effective components and running cost therefor as to the method for collecting the reaction byproducts generated in the melt polymerization method.

As the result of eager examinations by the present inventors in consideration of the above problems, an extensive improvement in the long term continuous operating period of producing polycarbonate resin to be obtained by the melt polymerization method, the reduction of the amount of the waste liquid, the simplification of the separation and recovery of the effective component, and the improvement of the qualities of the recovered effective components have been achieved by using the ejector as the vacuum pump and directly introducing the reaction byproducts into the ejector, and as the result, the cost reduction of the vacuum system and the recycling of the effective components are successfully performed In the ejector, by using a substance comprising the condensed reaction byproducts as the driving source and as the cooling liquid of the condenser, the following are achieved: the recovery and reuse thereof becomes easy; the effective components completely free from third components having possibilities of causing problems when recycled can be obtained; the environmental pollution due to waste water is not generated; and since the un-reacted substance and/or the lowly polymerized materials, which are adhered matters, are dissolvable to a phenolic compound, the incapacity of the operation owing to clogging does almost not occur by the cleaning effect thereof.

Also, since the ejector has a simple structure and does not have a moving part, the production limit range thereof is large and it is possible to deal with the drawing of a high temperature gas.

The ejector of the present invention can be used in a polymerization reactor operated under any condition of the melt polymerization process, but the most preferable application is to install it on a latter polymerization reactor which is operated at a vacuum of $666 \times 10^{-6}$ MPa (5 Torr) or lower at which the liquefaction and collection of the aromatic monohydroxy compound produced as byproduct is difficult, with the objects both of collecting the reaction byproducts and of working as a vacuum generator. When compared with the initial polymerization reactor, the latter polymerization reactor has a larger risk of the generation of clogging, but on the other hand, the quantity of the reaction byproducts generated is small, and thereby a relatively small sized ejector can afford even direct drawing of the reaction byproducts, the problem of the generation of clogging is solved, and the recovery of the effective components can be effectively performed. Thus, this method has many advantageous points.

Further, the ejector of the present invention can be used also in the initial polymerization reactor. In this case, the degree of vacuum on operation is low, but the quantity of the generation of the reaction byproducts is large, and a large sized ejector becomes necessary. So, rather than the reaction byproducts are drawn directly by an ejector, it is preferred that an ordinary surface condenser is placed before an ejector, most part of the vapor of the reaction byproducts are liquefied and collected by the surface condenser, and thereafter the remaining vapor is drawn and collected by the ejector of the present invention.

In the present invention, it is desirable that parts coming in contact with the reaction byproducts is constituted by an anticorrosion material. This "the parts coming in contact with the reaction byproducts is constituted by an anticorrosion material" means that any material of the vessel or piping containing the contacting parts, which does not damage the function of the vessel or piping and is not substantially dissolved out into the product in the ejector and the piping between the ejector and the vessel, is sufficient, but desirably, for example, in the case of the vessel or the piping, a stainless steel such as SUS304, SUS304L, SUS316, SUS316L, SUS630, SCS13, SCS14, SCS16, SCS19, SUS440C, SUS42OJ2, SCS2, etc., an anticorrosion metal such as nickel, titanium, an alloy such as an inconel, a nickel chromium steel, a hastelloy, etc., a plating such as HCr, Ni, casting up with a stellite, a ceramic coat or a carbon steel with a lining of a HIP (Hot isostatic press) method are used preferably. Especially the stainless steels are preferably used.

In the present invention, the parts coming in contact with the reaction byproducts means the parts where the material of the devices such as the piping, the reaction vessel, a vessel, etc., comes in contact directly with the reaction byproducts or the condensed reaction byproducts.

In the present invention, it is preferable to heat the wall surfaces of the vessel including the above ejector or the piping uniformly by a heating medium jacket, a warm water jacket, an electric heater, etc., without any irregularity for preventing the piping and vessel from the blockade.

Also it is necessary to heat the piping connecting the polymerization reactor and the ejector at a temperature at which the vapor of the byproduct phenolic compound, the decomposed materials in the reaction, the accompanied un-reacted materials and/or lowly polymerized materials in the reaction byproducts or the condensed reaction byproducts do not adhere, i.e., at a melting point or higher temperature, and more preferably at a temperature at which the vapor of the byproduct phenolic compound, the decomposed materials in the reaction, the accompanied un-reacted materials and/or lowly polymerized materials in the reaction byproducts or the condensed reaction byproducts do not condense, i.e., at a boiling point of the reaction byproducts under the reaction pressure or higher. Such a temperature as described concretely, is desirably 45° C. or higher, more desirably 80° C. or higher, further more desirably 155° C. or higher and most desirably 250° C. or higher.

The heated temperature of the wall surface of the ejector is desirably at 40.9° C. or higher at which the reaction byproducts do not solidify.

In the present invention, it is desirable that the piping between the polymerization reactor and the ejector is provided with a downward inclined slope so that the reaction byproducts do not return to the polymerization reactor and a pot at the lowest end thereof so as to collect the byproduct phenolic compound, the decomposed materials in the reaction, the accompanied un-reacted materials and/or lowly polymerized materials in the reaction byproducts adhered to the inside of the piping, and to be able to take out periodically such materials without changing the pressure in the polymerization reactor.

In the present invention, it is preferable that the vapor used for driving ejector is the vapor of the substance mainly comprising the condensed reaction byproducts, and substantially the vapor mainly comprising the compounds generated as byproduct in the transesterification reaction. Here, "substantially" means that some amount of other substances are allowed to be present in it. Such substances are not specifically limited, but the examples of such substances include a substance which is same as the main component of the compounds generated as byproduct in the transesterification reaction, an aromatic dihydroxy compound and the carbonic acid diester which are used as raw materials of the polymerization, impurities contained in these substances, substances formed by transesterification of these impurities, substances formed in the polymerization step by a reaction other than the transesterification, low molecular weight oligomers, substances such as water which may be absorbed from the environment, substances which are added in the range which does not damage the purposes of the present invention, and the like. The permissible amounts of these substances is the amount which can perform the liquefaction and collection at a pressure of 1000 Pa or lower in a barometric condenser placed to condense the driving vapor in the case where the vapor comprising the condensed reaction byproducts and said substances is used as the driving vapor for the ejector. The vapor containing also a substance other than the condensed reaction byproducts in the permissible range is called "the vapor substantially comprising a substance produced as byproduct by the transesterification reaction" in the present invention.

In further detailed explanation, the most preferred example of the substance other than condensed reaction byproducts contained in the substance comprising the reaction byproducts is the substance same as the main component of the reaction byproducts formed as byproduct in the reaction of an aromatic dihydroxy compound with the carbonic acid diester compound. For example, when diphenyl carbonate and bisphenol A are used as raw materials, phenol is preferred. By such a method, a monohydroxy compound and a carbonic acid diester compound, the main effective components, are recovered from the reaction byproducts; and when these substances are fed into a carbonic acid diester production process and a polymerization process, respectively, the method enables the easy performance of their separation and purification, and the obtaining of a high purity monohydroxy compound and carbonic acid diester free from a third component.

From the view point of the safety operation and the holding of efficiency of the ejector, the control of low boiling substances in the substance comprising the condensed reaction byproducts in the ejector system is important. The low boiling substances are substances having a boiling point lower than the reaction byproducts, and specifically, water mingled from the environment, heat decomposition products of the reaction byproducts and the like. As shown in FIG. 1, low boiling substances tend to accumulate in the system of the ejector. The low boiling substances in the system are brought into by the heat decomposition of the substance comprising the reaction byproducts in a vapor generator for driving, or accompanied by an additive when a substance other than the reaction byproducts is added into the system. On the other hand, the taking out from the ejector system is mainly performed as the bottom liquid of the driving vapor generator, which is free from the low boiling substances, and as the result, the low boiling substances accumulate in the ejector system. When the amount of low boiling substances increase, and the liquefaction and collection of the substances becomes difficult in the barometric condenser, the performance of the ejector rapidly lowers. Accordingly, it is necessary that the temperature of the substance comprising the reaction byproducts supplied into a barometric condenser as a collecting liquid is kept as low as possible, and at the same time the quantities of the low boiling substances in the condensed reaction byproducts is controlled to the concentration which can be liquefied and collected at a pressure of 1000 Pa or lower (i.e. the concentration at which the low boiling substances do not boil). The control of the content of the low boiling substances can be performed by any method, but commonly it is accomplished by purging from a storage tank of the condensed liquid (shown by No. 9 in FIG. 1). The content of low boiling substances in a cooling liquid to be used for a barometric condenser is preferably 2000 ppm or less.

The process will be explained further in detail with concrete examples. In the case where phenol is fed into the ejector system as the substance other than the condensed reaction byproducts, the accumulation of water in the ejector system becomes an issue since phenol is easy to absorb water. Here, it is important that the temperature of the liquid to be supplied to the barometric condenser is controlled at 60° C. or lower, and at the same time, the water content in the liquid to be supplied to the barometric condenser is controlled at 2000 ppm or lower, preferably 1500 ppm or lower, further preferably 1000 ppm or lower.

Also, the higher the vapor pressure for driving an ejector is, the more compact the ejector becomes. This is preferable, but since it is necessary to bear a facility cost for obtaining a necessary pressure resistance and also to heat for obtaining a vapor pressure for driving, the vapor pressure is decided in consideration of the thermal stability of the vapor for driving the ejector at the heated temperature. In the case of using the substance comprising the reaction byproducts containing mainly phenol as the vapor for driving the ejector, the substance is used at a pressure preferably within the range of 0.05 to 1.0 MPa, more preferably within the range of 0.05 to 0.7 MPa, further more preferably in the range of 0.15 to 0.7 MPa.

In the present invention, since the most preferable aromatic dihydroxy compound as the raw material for producing the polycarbonate resin is bisphenol A and the most preferable carbonic acid diester is diphenyl carbonate, as the material used for the vapor source for driving the ejector, the substance comprising the condensed reaction byproducts consisting mainly of phenol is the most preferable.

In the present invention, an ejector and a condenser are placed preferably in combination with the object of condensing both the driving vapor for the ejector and the drawing vapor. As such a condenser, a barometric condenser and a surface condenser are used, but the barometric condenser is preferable since it has little possibility of causing efficiency deterioration due to soiling.

The ejector in the present invention naturally has a function as a vacuum generator, but it is preferable to place ejectors and condensers serially in plural stages in order to get high ultimate vacuum. In this case, the ejectors and the condensers are not necessarily placed in paired manner; a condenser can be placed following plural ejectors which are placed without accompanied by any condenser. When a liquid seal pump or a liquid ejector is placed in the final stage, the condenser preceding the liquid ejector can be omitted.

In this case, a cooling liquid for cooling the introduced reaction byproducts to condense them is a liquid whose vapor pressure is lower than the operational pressure of the ejector at the operational temperature; and in the present invention, the liquid used as a cooling liquid for the condenser is the solution of a substance comprising the reaction byproducts, and the substance may contain, as mentioned above, a third component in the range where the component can be condensed at 1000 Pa or lower.

In the present invention, the barometric condenser means an apparatus for condensing a stream extraction by spraying the cooling liquid thereto for conducting a heat exchange with the reaction byproducts, and usually the cooling liquid and the condensed liquid are continuously taken out from a barometric leg by installing the same at the lower part of the barometric condenser. Further, the extraction streem means a vapor introduced into the ejector, which is a mixture of the reaction byproducts and air, etc., leaking into the reactor, etc., from the outside. In the present invention, "ejector" means an apparatus blowing a high pressure vapor as a driving source for drawing the reaction byproducts and passing the both fluids while mixing them through a diffuser for compressing, and is used by combining with the condenser.

Further, as the driving source of the ejector or the cooling liquid for the condenser, by not only using the reaction byproducts but also pouring a phenolic compound newly from the outside, a soiling at the ejector or the condenser is scarcely generated and it is desirable for a stable operation, since they do not contain impurities such as the decomposed materials in the reaction.

Also, there is sometimes, depending on operational conditions, etc., a fear that the operation becomes disturbed by the increase of the decomposition products of the reaction and/or the un-reacted materials, therefore, in the production of the polycarbonate, it is desirable to pour an aromatic monohydroxy compound such as a phenolic compound optionally for maintaining the composition of the condensation reaction mixture within a prescribed range. Especially, since a vapor generator for driving is operated at a high temperature, the possibility of the occurrence of decomposition is high, and it is preferable that the concentrations of the reaction byproducts in the vapor generator for driving are kept within a prescribed range to prevent the decomposition. As for such concentrations: in the case where an aromatic monohydroxy compound is same as the main component of the reaction byproducts formed as byproduct in the reaction of an aromatic dihydroxy compound with a carbonic acid diester compound, the ratio of the total of the aromatic monohydroxy compound as the main component of said condensed reaction byproducts and a poured aromatic monohydroxy compound based on the liquid phase in the vapor generator for driving is preferably 70% or more; and the concentration of the aromatic carbonic acid diester compound in the liquid phase in the vapor generator for driving ejectors is preferably 30 wt. % or less. More preferably, the concentration of the aromatic monohydroxy compound based on the liquid phase in the vapor generator for driving is 80% or more, especially 85% or more. By keeping the concentrations in this manner, safety operation is secured, and at the same time, the decomposition of the effective components are suppressed, and as the result, a high recovery ratio of the effective components and the recovery of the effective components having good quality become possible.

According to the used pressure and the amount of the stream extraction, the number of the ejectors and the condensers can be optionally changed. Here the amount of the extraction streem means the amount of the extraction stream by combining the reaction byproducts and air, etc., leaking into the polymerization reactor, etc., from the outside, and drawn into the ejector.

The pressure of the polymerization reactor can be controlled by the degree of the openness of a valve provided at the piping between the polymerization reactor and the ejector, or by blowing a gas into the piping between the polymerization reactor and the ejector. In the case of blowing the gas in, although any gas which can maintain the pressure by its own vapor pressure can be used, nitrogen or a phenol compound are preferable, the vapor of the material same as the main component of the reaction byproducts generated in the reaction of the aromatic dihydroxy compound with the carbonic diester compound is more preferable, and the gas which is a part of the vapor for driving ejectors is the most preferable.

As the last stage of the ejector, a liquid sealing pump or a liquid ejector is usually used. The use of the liquid ejector is more desirable since it is more durable against the soiling of the liquid. As the driving liquid in this case in a view point of the separation and recovery of the effective components and simplification of the process, the same substance as the main component of the condensed reaction byproducts generated in the reaction of the aromatic dihydroxy compound with the carbonic diester compound, is preferable. For example, in the case of using diphenyl carbonate and bisphenol A as the raw material, phenol is desirable.

In the present invention, a discharged liquid taken out from the barometric condenser is re-used as the cooling liquid for the barometric condenser after cooling to a prescribed temperature, and also used as an ejector driving vapor by heating with a boiler. The remaining portion is continuously discharged from the ejector system, and a monohydroxy compound and a carbonic acid diester compound, the main effective components, are separated and recovered; after purification if necessary, the monohydroxy compound is fed to a reaction byproduct collection process and a production process for a carbonic acid diester compound, which is a manufacturing raw material for polycarbonate resin, and the carbonic acid diester compound is fed to a polycondensation process as a raw material for polycarbonate resin, and thus they can be reused. Avoiding the use of third components having a possibility of harmfully working in the recycling processes of the effective components, the present invention exhibits further good effect in the recovery and reuse of the effective components.

In the present invention, it is preferable to supply the bottom liquid of the boiler of the vapor generator for driving ejectors mainly to the recovery process for the effective components, because the supply enables the reduction of the heat to be used for recovering the effective components and resultingly reduces thermal decomposition. Regarding the recovery method there is no specific limitation, but distillation is preferred.

A catalyst deactivator can be added to the polycarbonate resin of the present invention. As the catalyst deactivator of the present invention, known catalyst deactivators are effective, and among them, ammonium salts and phosphonium salts of a sulfonic acid are preferred; and ammonium salts and phosphonium salts of dodecylbenzenesulfonic acid such as dodecylbenzenesulfonic acid tetrabutylphosphonium salt, and ammonium salts and phosphonium salts of p-toluenesulfonic acid such as p-toluenesulfonic acid tetrabutylammonium salt are especially preferred. Further, as esters of sulfonic acids, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate and the like are preferred. Among these compounds, dodecylbenzenesulfonic acid tetrabutylphosphonium salt is the most preferred.

The quantity of use of such a catalyst deactivator is 0.5 to 50 equivalents, preferably 0.5 to 10 equivalents, more preferably 0.8 to 5 equivalents based on one equivalent of an above-mentioned polymerization catalyst selected from alkali metal compounds and/or alkaline earth metal compounds.

Hereinafter, one example of the ejector in the present invention is shown by FIG. 1. Provided that the FIG. 1 is only one executing style of the present invention, and the present invention is by no means limited by the figure.

The reaction byproducts generated in the polymerization reactor 1 which is operated at 133 Pa and air leaked into from the outside are drawn into a first stage ejector 3 through an inlet piping 13 for the vapor of the reaction byproducts. In this case, the wall surface of the inlet piping 13 for the vapor of the reaction byproducts is heated at a temperature of 200° C. or higher so that the vapor of the byproduct phenolic compound, the decomposition products of the reaction, the accompanied un-reacted materials and/or lowly polymerized materials are not solidified. Also, although a part of the vapor of the byproduct phenolic compound, the decomposition products of the reaction, the accompanied un-reacted materials and/or lowly polymerized materials adhere to the inside surface of the inlet piping for the vapor of the reaction byproducts 13, since the surface is heated at a temperature of the boiling point under the drawn pressure of the phenolic compound or higher, a part thereof is re-vaporized, and the rest is falling down through the inner surface of the inlet piping 13 for the vapor of the reaction byproducts by its own weight and accumulated in a polymer receiver 2.

In the first stage ejector 3, the vapor of the substance comprising the reaction byproducts at a pressure of 0.2 MPa is blown in through a driving vapor inlet piping 14 and introduced together with the vapor of the byproduct phenolic compound, the decomposition products of the reaction, the accompanied un-reacted materials and/or lowly polymerized materials and air leaked into from the outside into a first barometric condenser 4, and the most portion is condensed. Subsequently, the uncondensed vapor is drawn by a second stage ejector 5, the vapor of a substance comprising the reaction byproducts at a pressure of 0.2 MPa is blown in through an inlet piping 14 for driving vapor, and it is condensed by a second barometric condenser 6. The still remaining vapor is further drawn by a third stage ejector 7, the vapor of a substance comprising the reaction byproducts is blown in and it is drawn by a liquid ejector 8. To the liquid ejector 8, the first barometric condenser 4 and the second barometric condenser 6 is fed a substance comprising the condensed reaction byproducts, whose temperature is adjusted at 60° C. or lower by a cooler 11, from a hot well 9 by a pump 10 as a driving source and a cooling source.

To the first barometric condenser 4, the second barometric condenser 6 and the liquid ejector 8, the barometric legs 15 are connected respectively, and a liquid is taken out continuously to a hot well 9.

The driving vapor inlet piping 14 is provided with a jacket and heated at 210° C. to prevent the generation of a liquid by the condensation of the driving vapor.

All the sites in contact with the substance comprising the condensed reaction byproducts such as the first barometric condenser 4, the second barometric condenser 6, the liquid ejector 8, the hot well 9, the pump 10, the cooler 11 and the piping connecting them are kept at a temperature equal to the melting point of the substance comprising the condensed reaction byproducts or higher, and 60° C. or lower.

In order to use the liquid drawn into the hot well 9 as the cooling liquid for the first barometric condenser 4 and the second barometric condenser 6, and as the driving source of the liquid ejector 8, the same is sent to the cooler 11 by the pump 10 and cooled to a prescribed temperature and used, and also heated at the boiler 16 to become a driving source of the ejector by generating the vapor of the substance comprising the condensed reaction byproducts at a pressure of 0.2 MPa Further, at the start of an operation and sometimes during the operation, by using a supplying piping 20, a prescribed amount of the phenolic compound or sometimes the reaction byproducts which have been recovered and purified is infused into the hot well 9, and used as the cooling liquid for the first barometric condenser 4 and the second barometric condenser 6, the driving source for the liquid ejector 8, and the vapor for driving the ejector.

Further, when low boiling substances have been accumulated in the ejector system, a part of the accumulated condensed reaction byproducts is purged from the hot well 9 through a taking out piping 21, and if necessary, a phenolic compound free from low boiling substances, preferably a substance same as the condensed liquid of the reaction byproducts is supplied through the supplying piping 20.

The collected condensed reaction byproducts and the excess liquid are taken out through a liquid taking out piping 12 of the boiler 16, effective components such as the phenolic compound and aromatic carbonic acid diester are separated into each fraction by a recovery apparatus 17 by means of distillation, and after further purification if necessary, the phenolic compound is used as a supply liquid for the hot well 9 and also fed to the production process for carbonic acid diester compound, and the aromatic carbonic acid diester compound is fed to the polymerization process, separately, to recycle them.

EXAMPLES

Examples of the present invention are shown as follows. Further, these examples are intended to illustrate the present invention and the present invention is by no means limited by these examples.

Example 1

2,2-Bis(4-hydroxyphenyl)propane and diphenyl carbonate were charged in a melting vessel equipped with an agitator in a ratio of 1 mole to 1.05 mole respectively, and melted at 150° C. after nitrogen substitution.

Then the above molten mixture was supplied continuously at a rate of 60 kg/hour into a vertical type agitating vessel equipped with a rectifying column and kept at an inner temperature of 240° C. and an inside pressure of $1{,}333 \times 10^{-6}$ MPa, and also bisphenol A disodium salt of $1 \times 10^{-6}$ equivalent and tetramethylammonium hydroxide of $1 \times 10^{-4}$ equivalent based on 2,2-bis(4-hydroxyphenyl)propane of 1 mole were added continuously for performing the reaction while removing the produced phenol through the rectifying column.

The obtained reaction material was drawn out continuously by using a gear pump. The degree of polymerization of the obtained reaction material was determined by measuring its intrinsic viscosity. The intrinsic viscosity $[\eta]$ was obtained by measuring the solution of the reaction material with methylene chloride of 0.7 g/dl concentration by using Ubbelohde viscometer. As a result, a pre-polymer having a viscosity average molecular weight of 2500 was obtained.

Then the pre-polymer was supplied continuously into a horizontal type reactor kept at an inner temperature of 270° C. and an inside pressure of $1{,}33 \times 10^{-6}$ MPa. By further polymerizing the pre-polymer while removing the generated reaction byproducts by using the above-mentioned ejector related to the present invention and the above-mentioned method, a polycarbonate resin having a viscosity average molecular weight of 15000 was obtained continuously.

Then the above polycarbonate resin was supplied to a twin-screwed extruder for performing a deactivating treatment for the polymerization catalyst to obtain a stabilized polycarbonate resin continuously.

The ejector in the present invention was driven by the vapor of the condensed liquid obtained by collecting the reaction byproducts mainly comprising phenol at the pressure of 0.2 MPa, and connected to the horizontal reaction vessel as shown in the FIG. 1. The material at the part coming in contact with the reaction byproducts was made of SUS316. The ejector system was constituted by a first stage ejector, a first barometric condenser, a second stage ejector, a second barometric condenser, a third stage ejector and a liquid ejector, and the type of each condenser was the barometric condenser. The liquid collected in a hot well was circulated for use as the scrubber liquid for the condensers, a generating source for ejector driving vapor and the like, and on the other hand, a part of the liquid was sent to a separation/purification process for moisture control. Further, a part of the inner liquid of a vapor generator for driving the ejectors was taken out and sent to the separation/purification process in the same manner as the taken out liquid of the hot well in order to adjust the concentration of the diphenyl carbonate in said inner liquid. The separation/purification process was constituted of a distillation column, and low boiling impurities and high boiling impurities were separated and purified there; and the phenol out of the obtained effective components was reused as a feeding solution for the hot well and a production raw material for carbonic acid diester compound, and the diphenyl carbonate was reused as a polymerization raw material. By the above process, the water content of the inner liquid of the hot well was controlled at 500 ppm, and the diphenyl carbonate concentration of the inner liquid of the vapor generator was controlled at 10 wt. %.

A polymer receiver was installed in the middle of the inlet port pipe of the byproduct of the reaction and heated at 200° C. The scrubber liquid for the barometric condenser was cooled to 45° C. The piping for the vapor to drive the ejector was heated at 250° C. Other parts of the ejector system coming in contact with the substance comprising the reaction byproducts and the condensed reaction byproducts were kept at 51° C.

The continuous operation for 108 days was tried and it was possible to perform the operation without having any pressure fluctuation in the horizontal reactor.

The phenol and the diphenyl carbonate obtained by separating and purifying the reaction byproducts continuously drawn out during operation according to the above method were reused, and as the result, they were successfully used without having any trouble in operation and quality.

Comparative Example 1

An operation was conducted similarly to the example 1 except for using a phenol liquid sealing vacuum pump equipped with a mechanical booster instead of the ejector.

From 4th day after starting the operation, the fluctuation of the pressure was started to be observed, at 6th day the pump was stopped caused by an over load on a motor thereof, and the vacuum pump was exchanged to a reserved one. An examination of the stopped phenol liquid sealing vacuum pump by disassembling the same, revealed that the lubrication oil at the bearing was degenerated and a carbonized material was attached at the inner wall thereof.

The Effect of the Invention

By using the ejector having the previously described structure in the present invention, it becomes possible to perform the operation for a long period of time with generating a small amount of waste materials.

Figure 1:
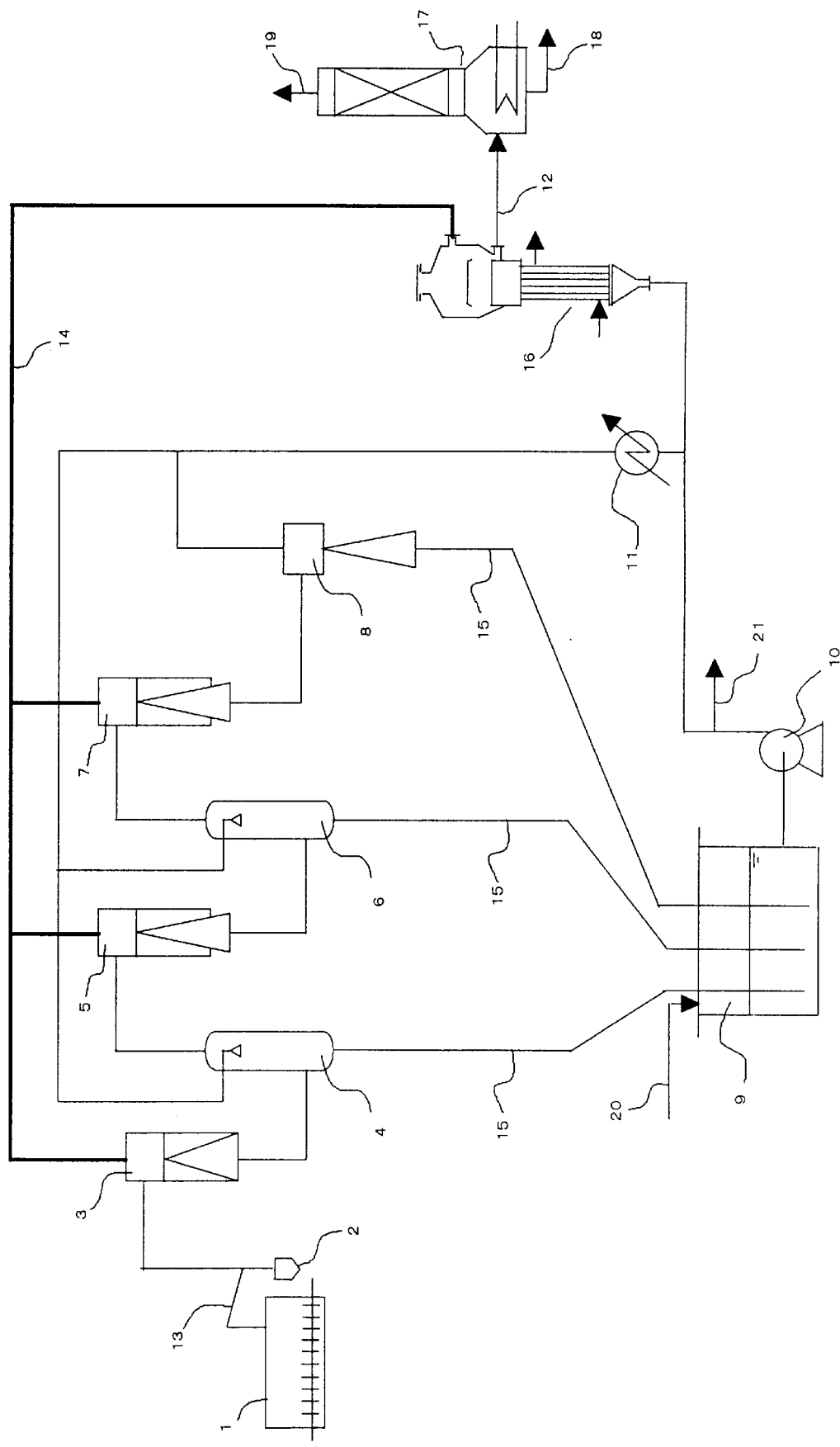
FIG. 1

One example of the ejector related to the present invention is shown.

EXPLANATION OF SYMBOLS

1. Polymerization reactor
2. Polymer receiver
3. First stage ejector
4. First barometric condenser
5. Second stage ejector
6. Second barometric condenser
7. Third stage ejector
8. Liquid ejector
9. Hot well
10. Pump
11. Cooler
12. Outlet piping for the bottom liquid of the boiler
13. Inlet piping for the vapor of the reaction byproducts
14. Inlet piping for the driving vapor
15. Barometric leg
16. Boiler
17. Purifying device
18. Supplying piping to the production process for polycarbonate resin other than the reaction byproduct collecting process.
19. Supplying piping to the production process for polycarbonate resin other than the reaction byproduct collecting process.
20. Supplying piping for a phenolic compound.
21. Taking out piping for a phenolic compound.

What is claimed is:

1. A process for producing polycarbonate having a step of performing a polycondensation reaction of an aromatic diol compound with a carbonic acid diester, wherein reaction byproducts are removed and collected by reducing the pressure in the reactor by means of an ejector which uses, as a driving source, vapor of a substance comprising condensed reaction byproducts substantially comprising aromatic monohydroxy compounds drawn by the ejector, and which are condensed into a condensate liquid comprising byproducts by a barometric condenser and wherein the wall between the polymerization reactor and the ejector is kept to have a temperature equal to the boiling temperature of said condensed byproducts or higher at a reduced pressure.

2. A process as claimed in claim 1, wherein more than 2 ejectors and more than 1 barometric condenser are used.

3. A process as claimed in claim 1, wherein the barometric condenser employs a cooling liquid comprising condensed reaction byproducts.

4. A process as claimed in claim 1, wherein a liquid ejector which uses, as a driving liquid, a liquid comprising condensed reaction byproducts is used as a final ejector.

5. A process as claimed in claim 1, wherein a liquid ejector which uses, as a driving liquid, a liquid comprising condensed reaction byproducts is used as a final ejector.

6. A process as claimed in claim 2, wherein a liquid ejector which uses, as a driving liquid, a liquid comprising condensed reaction byproducts is used as a final ejector.

7. A process as claimed in claim 1, wherein condensed byproducts generated from a polymerization reactor operating at 665 Pa (5 Torr) or below are collected by means of an ejector whose driving source is vapor of a substance comprising condensed reaction byproducts.

8. A process as claimed in claim 1, wherein the vapor pressure of the driving source of the ejector is 0.05 to 1.0 MPa.

9. A process as claimed in claim 1, wherein the barometric condenser employs a cooling liquid comprising low boiling compounds in an amount less than 2000 ppm.

10. A process as claimed in claim 5, wherein the barometric condenser employs a cooling liquid comprising low boiling compounds in an amount less than 2000 ppm.

11. A process as claimed in claim 1, wherein the temperature of the cooling liquid for use in the barometric condenser is less than 60° C.

12. A process as claimed in claim 5, wherein the temperature of the cooling liquid for use in the barometric condenser is less than 60° C.

13. A process as claimed in claims 1, wherein the reaction byproducts comprise an aromatic monohydroxy compound and an aromatic carbonic acid diester.

14. A process as claimed in claim 1, wherein the reaction byproducts comprise an aromatic monohydroxy compound and an aromatic carbonic acid diester.

15. A process as claimed in claims 4, wherein the reaction byproducts comprise an aromatic monohydroxy compound and an aromatic carbonic acid diester.

16. A process as claimed in claim 13, wherein the aromatic monohydroxy compound is a phenolic compound and the aromatic carbonic acid diester is a diaryl carbonate.

17. A process as claimed in claim 14, wherein the aromatic monohydroxy compound is a phenolic compound and the aromatic carbonic acid diester is a diaryl carbonate.

18. A process as claimed in claim 15, wherein the aromatic monohydroxy compound is a phenolic compound and the aromatic carbonic acid diester is a diaryl carbonate.

19. A process as claimed in claim 16, wherein the phenolic compound is phenol and the diaryl carbonate is diphenyl carbonate.

20. A process as claimed in claim 11, wherein the phenolic compound is phenol and the diaryl carbonate is diphenyl carbonate.

21. A process as claimed in claim 18, wherein the phenolic compound is phenol and the diaryl carbonate is diphenyl carbonate.

22. A process as claimed in claim 1, having a vapor generator for driving the ejector, wherein the content of the aromatic carbonic acid diester in the liquid phase of the generator is 30 wt % or less.

23. A process for producing a polycarbonate resin having a step of performing a polycondensation reaction of an aromatic diol compound with a carbonic acid diester compound, wherein the condensed reaction byproducts generated during the polycondensation of the polycarbonate are drawn and collected by means of an ejector which uses, as a driving source, vapor of a substance comprising the said condensed byproducts and by means of a barometric condenser which uses a liquid comprising the condensed byproducts as a cooling liquid, and a part thereof is fed into the production process of the polycarbonate resin, after purification as necessary.

24. A process as claimed in claim 1, wherein stainless steel is used as a material of the ejector.

25. A process as claimed in claim 23, wherein stainless steel is used as a material of the ejector.

* * * * *